United States Patent
Park et al.

(10) Patent No.: US 9,860,933 B2
(45) Date of Patent: Jan. 2, 2018

(54) METHOD AND APPARATUS FOR TRANSMITTING DATA IN WIRELESS COMMUNICATION SYSTEM

(71) Applicant: LG ELECTRONICS INC., Seoul (KR)

(72) Inventors: Sungjun Park, Seoul (KR); Youngdae Lee, Seoul (KR); Seungjune Yi, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 14/649,724

(22) PCT Filed: Jan. 14, 2014

(86) PCT No.: PCT/KR2014/000382
§ 371 (c)(1),
(2) Date: Jun. 4, 2015

(87) PCT Pub. No.: WO2014/112767
PCT Pub. Date: Jul. 24, 2014

(65) Prior Publication Data
US 2015/0373767 A1 Dec. 24, 2015

Related U.S. Application Data

(60) Provisional application No. 61/752,934, filed on Jan. 15, 2013, provisional application No. 61/754,656, filed on Jan. 21, 2013.

(51) Int. Cl.
*H04W 76/02* (2009.01)
*H04W 16/32* (2009.01)
(Continued)

(52) U.S. Cl.
CPC .......... *H04W 76/025* (2013.01); *H04W 16/32* (2013.01); *H04W 28/06* (2013.01);
(Continued)

(58) Field of Classification Search
None
See application file for complete search history.

(56) References Cited

U.S. PATENT DOCUMENTS

2010/0008259 A1   1/2010  Yoon et al.
2010/0278141 A1*  11/2010  Choi-Grogan .... H04W 36/0083
                                                      370/331
(Continued)

OTHER PUBLICATIONS

PCT International Application No. PCT/KR2014/000382, Written Opinion of the International Searching Authority dated Apr. 21, 2014, 1 page.

*Primary Examiner* — Duc T Duong
(74) *Attorney, Agent, or Firm* — Lee Hong Degerman Kang Waimey

(57) ABSTRACT

A method and apparatus for transmitting data in a wireless communication system is provided. A user equipment (UE) establishes dual connectivity with at least one first cell and at least one second cell, receives an indication which indicates that a data transmission path of a radio bearer is to be configured for the at least one first cell, configures the data transmission path of the radio bearer for the at least one first cell, and transmits data via the data transmission path on the at least one first cell.

6 Claims, 14 Drawing Sheets

(51) Int. Cl.
*H04W 28/06* (2009.01)
*H04W 84/04* (2009.01)
*H04W 88/06* (2009.01)
*H04W 88/08* (2009.01)
*H04W 40/02* (2009.01)
*H04W 84/20* (2009.01)

(52) U.S. Cl.
CPC .......... *H04W 40/02* (2013.01); *H04W 84/045* (2013.01); *H04W 84/20* (2013.01); *H04W 88/06* (2013.01); *H04W 88/08* (2013.01)

(56) References Cited

U.S. PATENT DOCUMENTS

| | | | |
|---|---|---|---|
| 2011/0019644 A1 | 1/2011 | Cheon et al. | |
| 2012/0039226 A1 | 2/2012 | Yang et al. | |
| 2012/0184266 A1 | 7/2012 | Faccin et al. | |
| 2012/0207011 A1 | 8/2012 | Franklin et al. | |
| 2013/0021929 A1* | 1/2013 | Kim | H04B 7/024 370/252 |
| 2014/0071936 A1* | 3/2014 | Zhang | H04L 25/0226 370/330 |
| 2014/0128092 A1* | 5/2014 | Xiong | H04W 24/02 455/454 |
| 2014/0177560 A1* | 6/2014 | Guo | H04W 72/1268 370/329 |
| 2014/0179320 A1* | 6/2014 | Jang | H04W 36/30 455/436 |
| 2014/0192775 A1* | 7/2014 | Li | H04W 36/0072 370/331 |
| 2014/0342738 A1* | 11/2014 | Ishii | H04W 28/08 455/436 |
| 2015/0063091 A1* | 3/2015 | Vesterinen | H04W 76/028 370/216 |
| 2015/0094073 A1* | 4/2015 | Peng | H04W 76/022 455/450 |
| 2015/0172015 A1* | 6/2015 | Won | H04L 5/0035 370/329 |
| 2015/0201354 A1* | 7/2015 | Zhang | H04W 36/0022 370/221 |
| 2015/0230236 A1* | 8/2015 | Zeng | H04L 41/0806 370/329 |
| 2015/0244429 A1* | 8/2015 | Zhang | H04B 7/024 370/329 |
| 2017/0245255 A1* | 8/2017 | Lin | H04W 72/044 |

* cited by examiner

METHOD AND APPARATUS FOR TRANSMITTING DATA IN WIRELESS COMMUNICATION SYSTEM

CROSS-REFERENCE TO RELATED APPLICATIONS

This application is the National Stage filing under 35 U.S.C. 371 of International Application No. PCT/KR2014/000382, filed on Jan. 14, 2014, which claims the benefit of U.S. Provisional Application No. 61/752,934, filed on Jan. 15, 2013 and 61/754,656, filed on Jan. 21, 2013, the contents of which are all hereby incorporated by reference herein in their entirety.

BACKGROUND OF THE INVENTION

Field of the Invention

The present invention relates to wireless communications, and more specifically, to a method and apparatus for transmitting data in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable. Small cell enhancements for the 3GPP LTE will focus on additional functionalities for enhanced performance in hotspot areas for indoor and outdoor using low power nodes.

In light of operator's big interest in deploying small cells overlaid in a macro cell, some issues are identified for small cell enhancements. One of the issues is to introduce user equipments (UEs) having dual connectivity to a macro cell and small cells. For example, the UE has one connectivity to a macro cell for control plane aspects and another connectivity to a small cell for user plane aspects.

To support such dual connectivity to different cells, radio bearers would be configured differently for different cells. For example, the UE would be configured only with signaling radio bearers (SRBs) only for a macro cell and configured with data radio bearers (DRBs) only for small cells. However, because radio bearers are configured per UE currently, it is not possible to selectively configure radio bearers per cell.

Accordingly, a method for configuring radio bearers per cell may be required.

SUMMARY OF THE INVENTION

The present invention provides a method and apparatus for transmitting data in a wireless communication system. The present invention provides a method for configuring radio bearers per cell, not per user equipment (UE). The present invention provides a method for indicating a data transmission path of a radio bearer which is to be configured for a specific cell.

In an aspect, a method for transmitting, by a user equipment (UE), data in a wireless communication system is provided. The method includes establishing dual connectivity with at least one first cell and at least one second cell, receiving an indication which indicates that a data transmission path of a radio bearer is to be configured for the at least one first cell, configuring the data transmission path of the radio bearer for the at least one first cell, and transmitting data via the data transmission path on the at least one first cell.

The at least one first cell may be included in a first cell group.

The at least one second cell may be included in a second cell group.

The indication may further include information on the at least one first cell for which the data transmission path of the radio bearer is to be configured.

The data transmission path of the radio bearer for the at least one first cell may be configured based on the information on the at least one first cell.

The information on the at least one first cell may include at least one of a cell index, cell identifier (ID), and physical cell ID of the at least one first cell.

The information on the at least one first cell may include an index of a group in which the at least one first cell is included.

The method may further include receiving group information, which indicates which cell belongs to which group, for the index of the group.

The at least one first cell may be a macro cell and is controlled by a master eNodeB (MeNB).

The radio bearer may be a signaling radio bearer (SRB).

The at least one first cell may be a small cell and is controlled by a secondary eNodeB (SeNB).

The radio bearer may be a data radio bearer (DRB).

The indication may be received from an MeNB.

In another aspect, a user equipment (UE) in a wireless communication system is provided. The UE includes a radio frequency (RF) unit for transmitting or receiving a radio signal, and a processor coupled to the RF unit, and configured to establish dual connectivity with at least one first cell and at least one second cell, receive an indication which indicates that a data transmission path of a radio bearer is to be configured for the at least one first cell, configure the data transmission path of the radio bearer for the at least one first cell, and transmit data via the data transmission path on the at least one first cell.

An operator can operate a macro cell and small cells so that the macro cell processes data of specific important services, and the small cells process data of best effort services.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
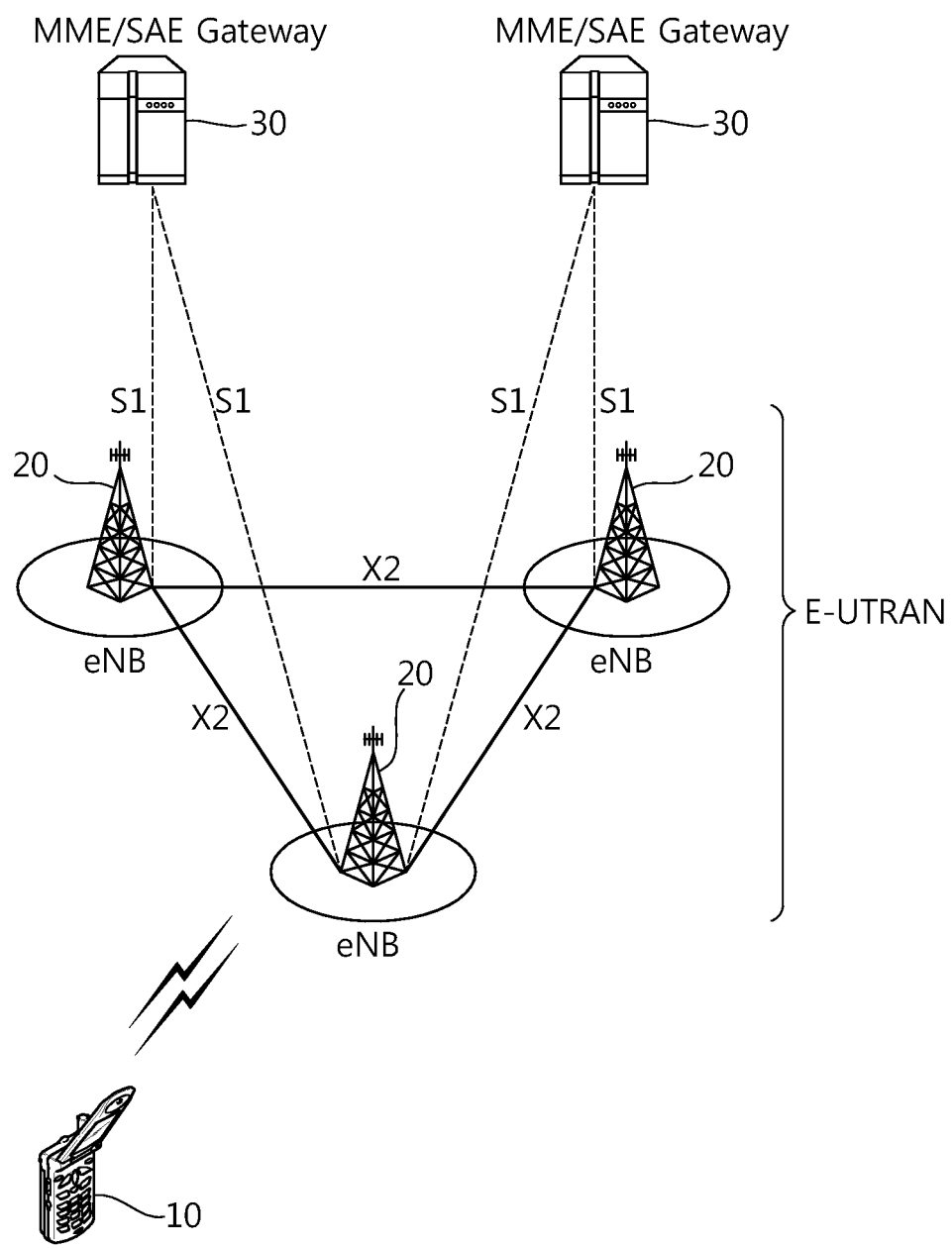
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
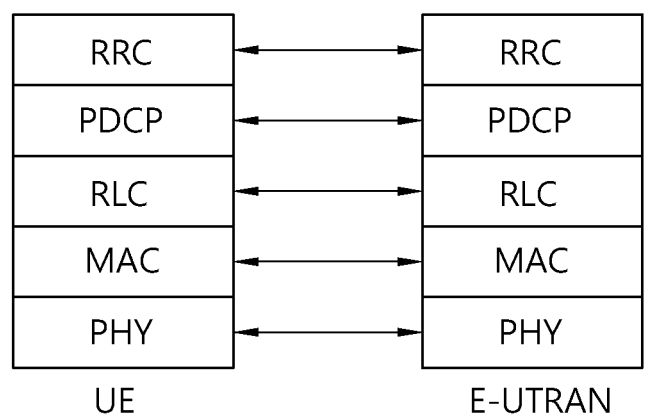
FIG. 2 shows a control plane of a radio interface protocol of an LTE system.
Figure 3:
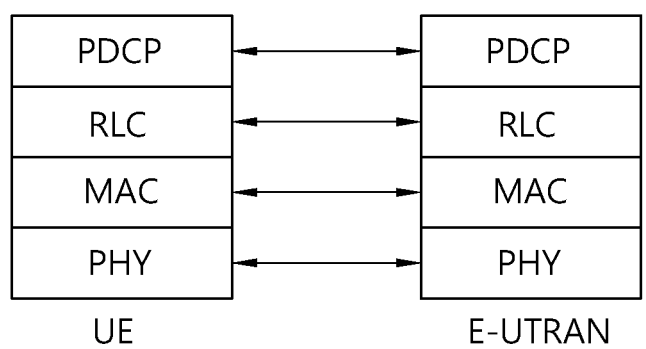
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
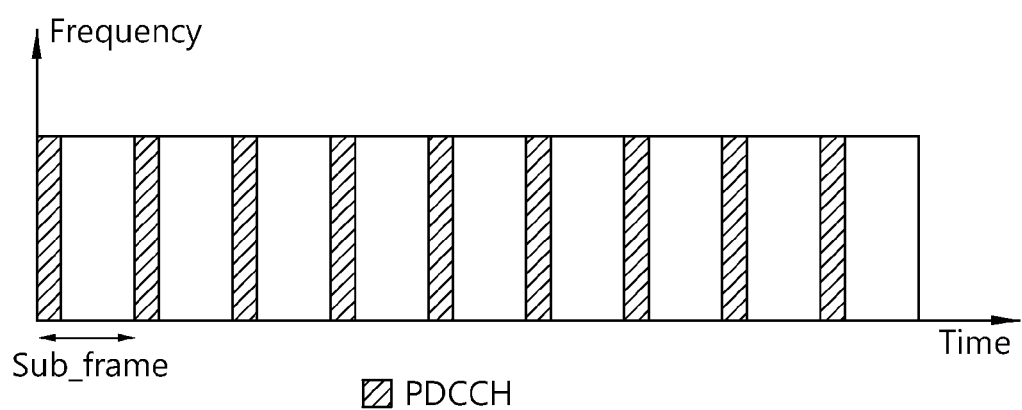
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped to the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−RxPilot+ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value In the UL in the signature.

Carrier aggregation (CA) is described. It may be referred to Section 5.5 of 3GPP TS 36.300 V11.4.0 (2012-12).

In the CA, two or more component carriers (CCs) are aggregated in order to support wider transmission bandwidths up to 100 MHz. A UE may simultaneously receive or transmit on one or multiple CCs depending on its capabilities. A Rel-10 UE with reception and/or transmission capabilities for CA can simultaneously receive and/or transmit on multiple CCs corresponding to multiple serving cells. A Rel-8/9 UE can receive on a single CC and transmit on a single CC corresponding to one serving cell only.

Figure 5:
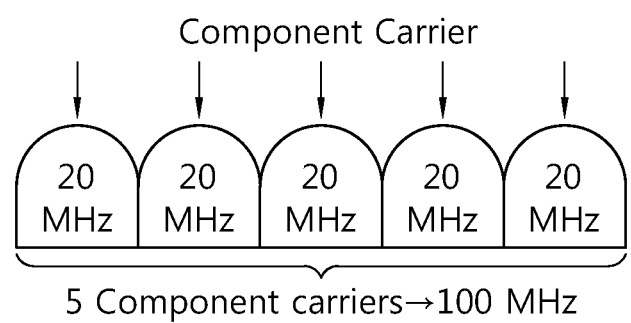
FIG. 5 shows an example of a carrier aggregation of 3GPP LTE-A.

FIG. 5 shows an example of a carrier aggregation of 3GPP LTE-A. Referring to FIG. 5, each CC has a bandwidth of 20 MHz, which is a bandwidth of 3GPP LTE. Up to 5 CCs may be aggregated, so maximum bandwidth of 100 MHz may be configured.

A cell is combination of downlink resources and optionally uplink resources. The linking between the carrier frequency of the downlink resources and the carrier frequency of the uplink resources is indicated in the system information transmitted on the downlink resources. A serving cell may consist of one DL CC and one UL CC. Or, a serving cell may consist of one DL CC only. In the CA, there may be a plurality of serving cells, and the plurality of serving cells consists may consist of one primary cell (PCell) and at least one secondary cell (SCell). A PUCCH transmission and random access procedure may be performed only in the PCell.

Figure 6:
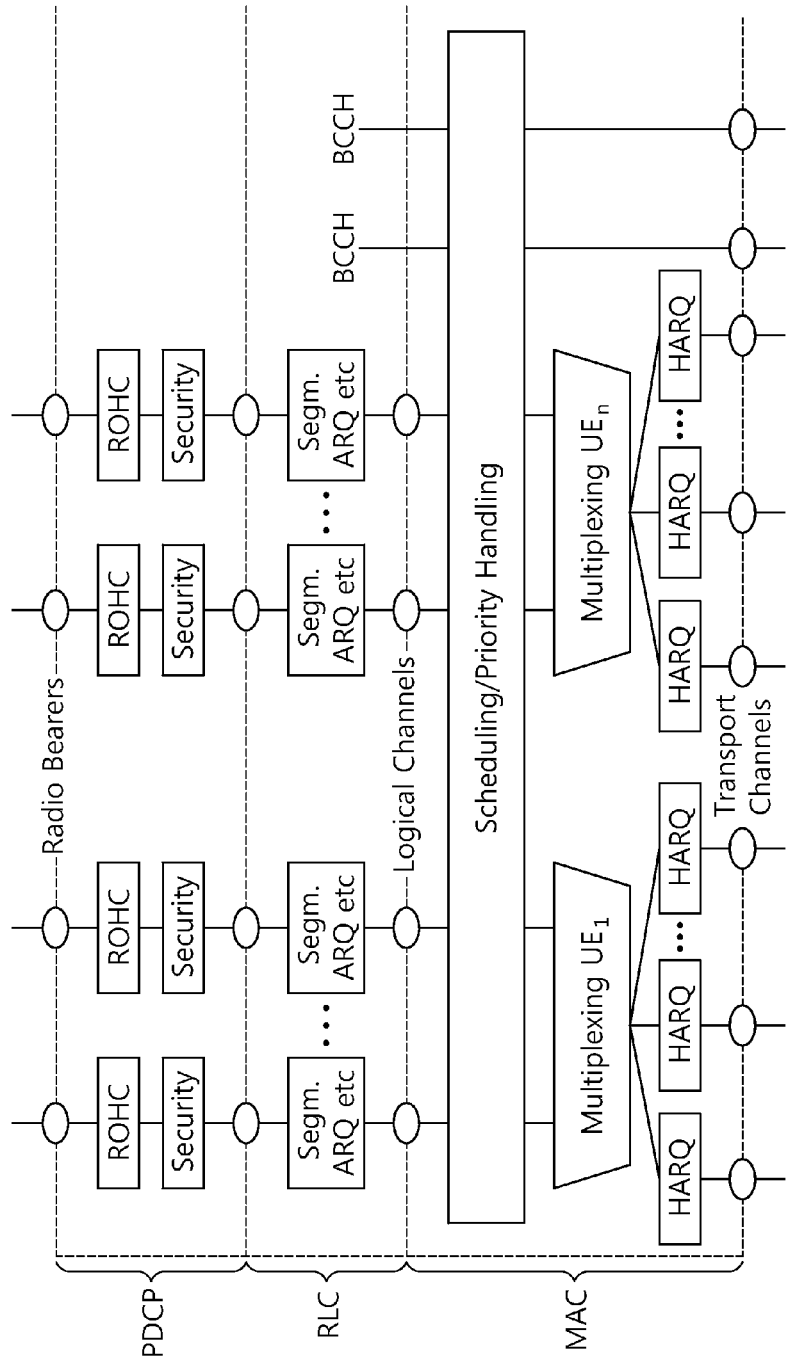
FIG. 6 shows an example of a structure of DL layer 2 when carrier aggregation is used.
Figure 7:
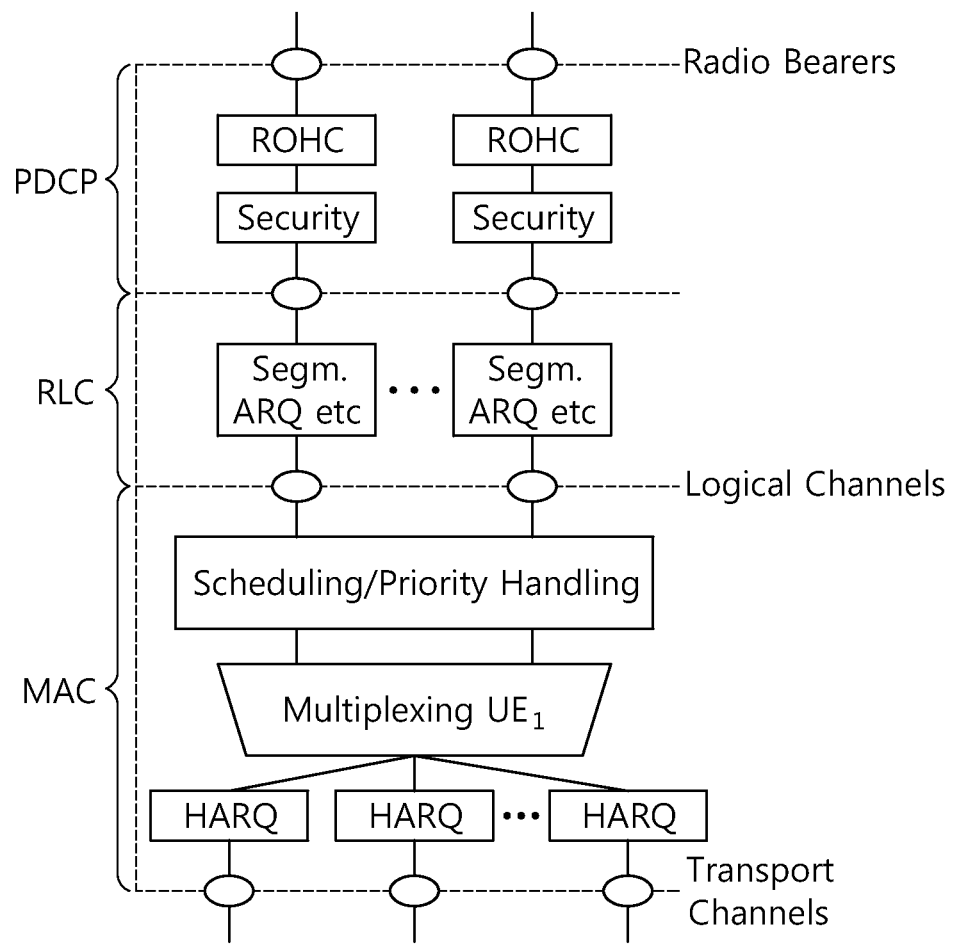
FIG. 7 shows an example of a structure of UL layer 2 when carrier aggregation is used.

FIG. 6 shows an example of a structure of DL layer 2 when carrier aggregation is used. FIG. 7 shows an example of a structure of UL layer 2 when carrier aggregation is used. The carrier aggregation may affect a MAC layer of the L2. For example, since the carrier aggregation uses a plurality of CCs, and each hybrid automatic repeat request (HARQ) entity manages each CC, the MAC layer of 3GPP LTE-A using the CA shall perform operations related to a plurality of HARQ entities. Further, each HARQ entity processes a transport block independently. Therefore, when the CA is used, a plurality of transport blocks may be transmitted or received at the same time through a plurality of CCs.

Small cell enhancement is described. It may be referred to 3GPP TR 36.932 V12.0.0 (2012-12).

Figure 8:
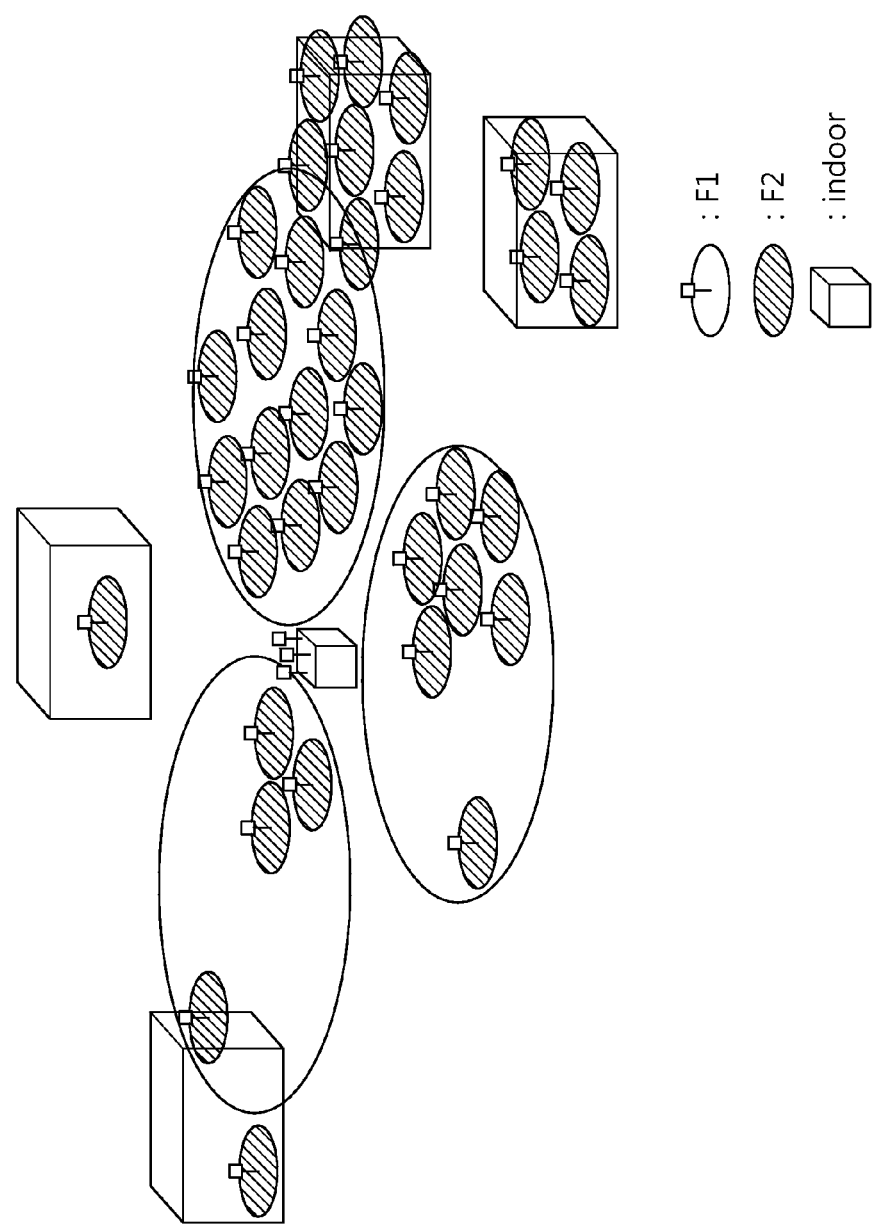
FIG. 8 shows deployment scenarios of small cells with/without macro coverage.

FIG. 8 shows deployment scenarios of small cells with/without macro coverage. Small cell enhancement should target both with and without macro coverage, both outdoor and indoor small cell deployments and both ideal and non-ideal backhaul. Both sparse and dense small cell deployments should be considered.

Referring to FIG. 8, small cell enhancement should target the deployment scenario in which small cell nodes are deployed under the coverage of one or more than one overlaid E-UTRAN macro-cell layer(s) in order to boost the capacity of already deployed cellular network. Two scenarios can be considered:
  where the UE is in coverage of both the macro cell and the small cell simultaneously
  where the UE is not in coverage of both the macro cell and the small cell simultaneously.

Also, the deployment scenario where small cell nodes are not deployed under the coverage of one or more overlaid E-UTRAN macro-cell layer(s) may be considered.

Small cell enhancement should target both outdoor and indoor small cell deployments. The small cell nodes could be deployed indoors or outdoors, and in either case could provide service to indoor or outdoor UEs.

Both ideal backhaul (i.e., very high throughput and very low latency backhaul such as dedicated point-to-point connection using optical fiber, line-of-sight (LOS) microwave) and non-ideal backhaul (i.e., typical backhaul widely used in the market such as xDSL, non-LOS (NLOS) microwave, and other backhauls like relaying) should be studied. The performance-cost trade-off should be taken into account.

For interfaces between macro and small cell, as well as between small cells, the studies should first identify which kind of information is needed or beneficial to be exchanged between nodes in order to get the desired improvements before the actual type of interface is determined And if direct interface should be assumed between macro and small cell, as well as between small cell and small cell, X2 interface can be used as a starting point.

Small cell enhancement should consider sparse and dense small cell deployments. In some scenarios (e.g., hotspot indoor/outdoor places, etc), single or a few small cell node(s) are sparsely deployed, e.g., to cover the hotspot(s). Meanwhile, in some scenarios (e.g., dense urban, large shopping mall, etc), a lot of small cell nodes are densely deployed to support huge traffic over a relatively wide area covered by the small cell nodes. The coverage of the small cell layer is generally discontinuous between different hotspot areas. Each hotspot area can be covered by a group of small cells, i.e., a small cell cluster.

Furthermore, smooth future extension/scalability (e.g., from sparse to dense, from small-area dense to large-area dense, or from normal-dense to super-dense) should be considered. For mobility/connectivity performance, both sparse and dense deployments should be considered with equal priority.

Both synchronized and un-synchronized scenarios should be considered between small cells as well as between small cells and macro cell(s). For specific operations, e.g., interference coordination, carrier aggregation and inter-eNB coordinated multipoint (COMP), small cell enhancement can benefit from synchronized deployments with respect to small cell search/measurements and interference/resource management. Therefore time synchronized deployments of small cell clusters are prioritized in the study and new means to achieve such synchronization shall be considered.

Small cell enhancement should address the deployment scenario in which different frequency bands are separately assigned to macro layer and small cell layer, respectively, where F1 and F2 in FIG. 8 correspond to different carriers in different frequency bands.

Small cell enhancement should be applicable to all existing and as well as future cellular bands, with special focus on higher frequency bands, e.g., the 3.5 GHz band, to enjoy the more available spectrum and wider bandwidth.

Small cell enhancement should also take into account the possibility for frequency bands that, at least locally, are only used for small cell deployments.

Co-channel deployment scenarios between macro layer and small cell layer should be considered as well.

Some example spectrum configurations are:
  Carrier aggregation on the macro layer with bands X and Y, and only band X on the small cell layer
  Small cells supporting carrier aggregation bands that are co-channel with the macro layer
  Small cells supporting carrier aggregation bands that are not co-channel with the macro layer One potential co-channel deployment scenario is dense outdoor co-channel small cells deployment, considering low mobility UEs and non ideal backhaul. All small cells are under the Macro coverage.

Small cell enhancement should be supported irrespective of duplex schemes (FDD/TDD) for the frequency bands for macro layer and small cell layer. Air interface and solutions for small cell enhancement should be band-independent, and aggregated bandwidth per small cell should be no more than 100 MHz.

In a small cell deployment, it is likely that the traffic is fluctuating greatly since the number of users per small cell node is typically not so large due to small coverage.

In a small cell deployment, it is likely that the user distribution is very fluctuating between the small cell nodes. It is also expected that the traffic could be highly asymmetrical, either downlink or uplink centric.

Both uniform and non-uniform traffic load distribution in time-domain and spatial-domain should be considered. Non-full buffer and full buffer traffic are both included, and non-full buffer traffic is prioritized to verify the practical cases.

Backward compatibility, i.e., the possibility for legacy (pre-Release 12) UEs to access a small-cell node/carrier, is desirable for small cell deployments.

The introduction of non-backwards compatible features should be justified by sufficient gains.

For small cell enhancement, dual connectivity may be supported. By dual connectivity, a UE may be connected to both a macro cell and small cell.

Figure 9:
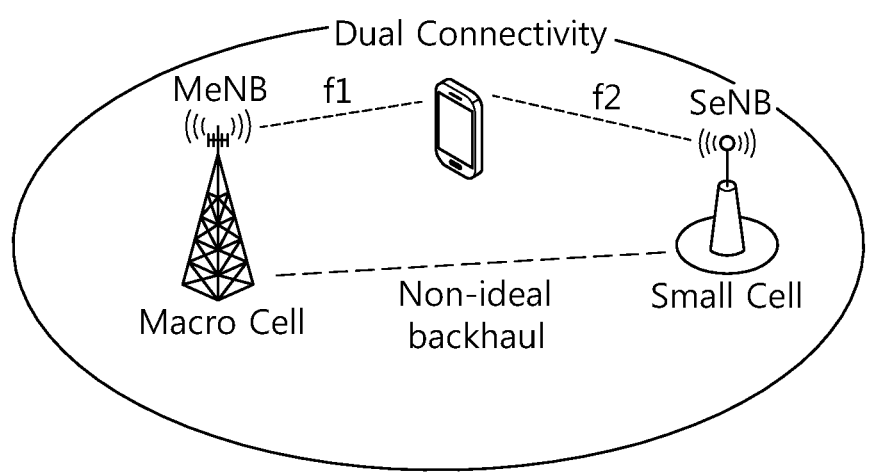
FIG. 9 shows an example of dual connectivity to a macro cell and small cell.

FIG. 9 shows an example of dual connectivity to a macro cell and small cell.

Referring to FIG. 9, an MeNB stands for a master eNB (or, a macro cell eNB), and an SeNB stands for a secondary eNB (or, a small cell eNB). The UE has a connection with the MeNB in frequency f1. In dual connectivity, the MeNB controls the macro cell, and is the eNB which terminates at least S1-MME and therefore act as mobility anchor towards the CN. Also, the UE has a connection with the SeNB in frequency f2. In dual connectivity, the SeNB controls one or more small cells, and is the eNB providing additional radio resources for the UE, which is not the MeNB. Accordingly, the UE may receive control signaling from the MeNB, and may receive data from the SeNB. The interface between the MeNB and SeNB is called an Xn interface. The Xn interface is assumed to be non-ideal backhaul. For example, delay in the Xn interface could be up to 60 ms.

Figure 10:
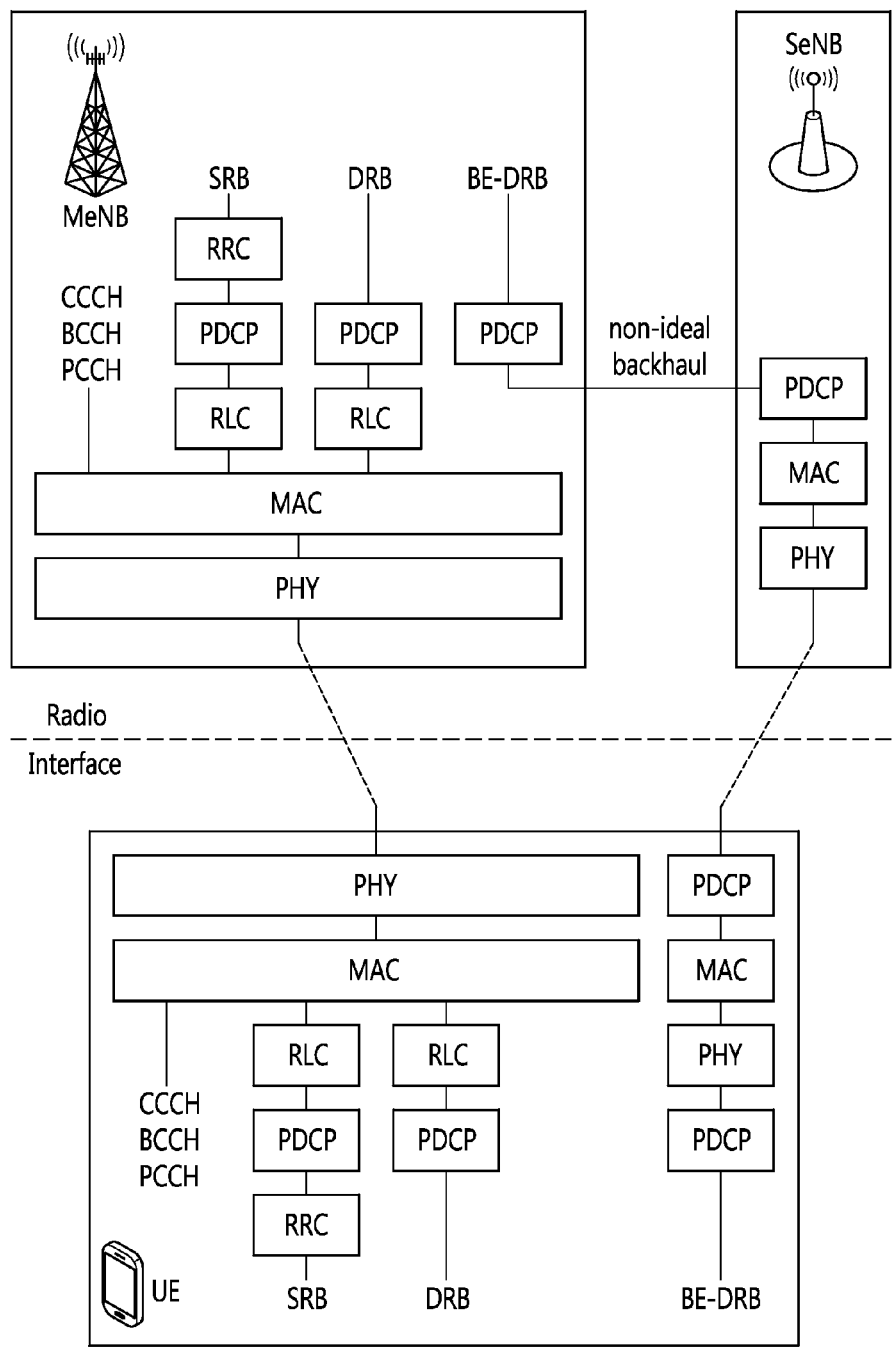
FIG. 10 shows an example of protocol architecture supporting dual connectivity.

FIG. 10 shows an example of protocol architecture supporting dual connectivity.

Referring to FIG. 10, the SeNB is responsible for transmitting best effort (BE) type traffic, while the MeNB is responsible for transmitting other types of traffic such as voice over VoIP, streaming data, or signaling data. That is, the SeNB is responsible for transmitting BE-DRBs, and the MeNB is responsible for transmitting other RB, such as SRBs and other DRBs. In the architecture described in FIG. 10, PDCP and RLC entities are located in different network nodes. That is, the PDCP entity is located in the MeNB and the RLC entity is located in the SeNB. In the UE side, the protocol architecture is same as prior art except that the MAC entity is setup for each eNB (i.e., MeNB and SeNB). Meanwhile, the protocol architecture described in FIG. 10 is just an example, and various protocol architectures may be used.

Currently, radio bearer configurations are applied to all cells configured to a UE. Therefore, the UE transmits and/or receives data of configured radio bearer through all configured cells. If the UE has dual connectivity with a macro cell and small cells, a method in which important data, e.g., controlling signaling or voice service, is transmitted or received on a macro cell, and data of the remaining best effort services is transmitted or received on small cells may be required. However, data transmission/reception of a specific radio bearer is not restricted to a specific cell currently.

Hereinafter, a method for configuring radio bearers per cell according to an embodiment of the present invention is described. According to an embodiment of the present invention, when a radio bearer is established, the radio bearer is configured only for the indicated cell or group of cells. The cell or group of cells for which the radio bearer is configured may be explicitly and/or implicitly indicated by the eNB.

When the cell or group of cells for which radio bearers are configured is explicitly indicated, the eNB may transmit an indication to the UE when the radio bearer is established. The indication may include information on the cell or group of cells for which the radio bearer is configured. The information on the cell may include a cell index, cell identifier (ID), and/or physical cell ID. The information on the group of cells may include a group index. For the group index, when the group of cells is configured to the UE, the eNB may indicate group information to the UE. The group information may indicate which cell belongs to which group. For example, small cells may belong to one group and the macro cell may belong to another group.

When the cell or group of cells for which radio bearers are configured is implicitly indicated, SRBs may be configured only for the macro cell and DRBs may be configured only for the small cell or group of small cells. Information on whether the cell is the macro cell or small cell may be also indicated by the eNB. For example, if the macro cell is configured as a PCell and small cells are configured as SCell, SRBs may be configured only for the PCell and DRBs may be configured only for the SCells. Or, if the macro cell is configured as an anchor cell and small cells are configured as the PCell and/or SCells, SRBs may be configured only for the anchor cell and DRBs may be configured only for PCell and/or SCells.

The DRBs may be further grouped. The group of DRBs is called a set of DRBs. There may be several sets of DRBs configured for the UE. The eNB may configure the sets of DRBs to the UE. Possible sets of DRBs may be such that one set of DRBs is for a group of small cells and another set of DRBs is for macro cell. Or, one set of DRBs may be for a group of some small cells and another set of DRBs may be for another group of some small cells.

The SRBs may be also further grouped. The group of SRBs is called a set of SRBs. There may be several sets of SRBs. The eNB may configure the sets of SRBs to the UE. Possible sets of SRBs may be such that one set of SRBs is for a group of small cells and another set of SRBs is for macro cell.

Different indication may be also used for the DRBs and SRBs. For example, one indication may be used for a DRB configuration and another indication may be used for an SRB configuration.

Cell information configured in a radio bearer may include information on a plurality of cells. Accordingly, the UE may transmit and/or receive data of a specific radio bearer through a plurality of cells if the specific radio bearer is configured with the plurality of cells. In order for the eNB to configure the radio bearers for a specific cell or group of cells to the UE, a common radio bearer configuration may be used. Specifically, a radio bearer in the common radio configuration owns its radio bearer ID. Then, a cell-specific configuration includes radio bearer ID(s). Then, when the UE is configured with the cell by the cell-specific configuration, the UE is also configured with radio bearers for the cell by the indicated radio bearer IDs according to the common radio configuration. For example, it is assumed that the eNB configures three radio bearers by the common radio bearer configuration. Radio bearer IDs of the three radio bearers are A, B, and C, respectively. Then, the eNB transmits cell-specific configurations including radio bearer ID(s). Assume there are two cells (cell 1 and cell 2) configured to the UE. Configuration for the cell 1 includes radio bearer ID A and B. Configuration for the cell 2 includes radio bearer B and C. Consequently, the cell 1 uses radio bearer A and B according to the common radio bearer configuration, and the cell 2 uses radio bearer B and C according to the common radio bearer configuration.

Figure 11:
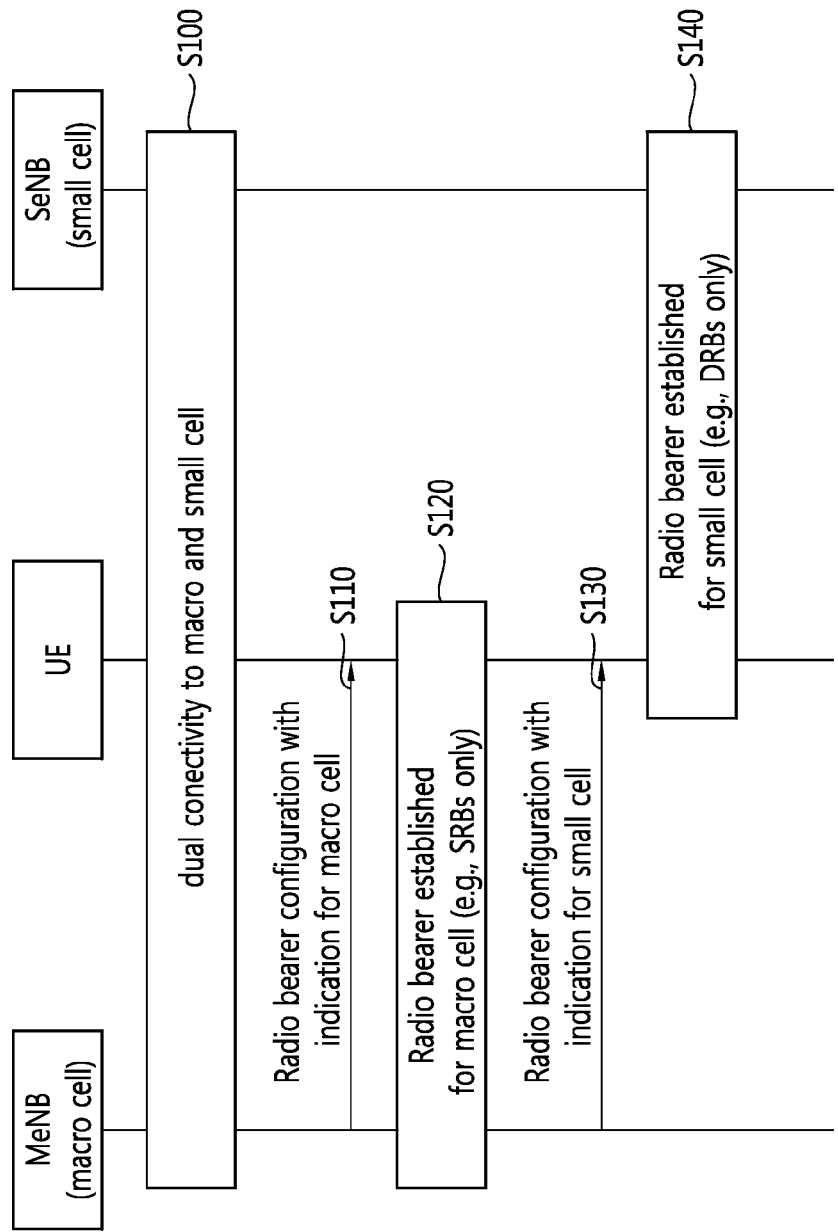
FIG. 11 shows an example of a radio configuration per cell according to an embodiment of the present invention.

FIG. 11 shows an example of a radio configuration per cell according to an embodiment of the present invention.

In step S100, the UE has dual connectivity to the macro cell and small cell. It would be possible that the same node serves both the macro cell and small cell.

In step S110, the eNB, which controls the macro cell, transmits radio bearer configurations for the macro cell to the UE. The radio bearer configurations may include an indication to indicate information on a cell for which radio bearers are configured. In this example, the information on the cell indicates the macro cell by e.g., the cell ID. Also, the radio bearer configurations may include configurations only for SRBs.

In step S120, upon receiving the radio bearer configurations for the macro cell, the UE is configured with the SRBs only for the macro cell. Therefore, the UE receives/transmits data only on the SRBs via the macro cell.

In step S130, the eNB, which controls the macro cell, transmits radio bearer configurations for the small cell to the UE. The radio bearer configurations may also include an indication to indicate information on a cell for which radio bearers are configured. In this example, information on the cell indicates the small cell by e.g., the cell ID. If the UE is configured with more than one small cell, the indication may indicate information on a group of cells. So, in this example, information on the group of cells may indicate a group of small cells. Also, the radio bearer configurations may include configurations only for DRBs.

In step S140, upon receiving the radio bearer configurations for the small cell, the UE is configured with the DRBs only for the small cell(s). Therefore, the UE receives/transits data only on the DRBs via the small cell(s).

Figure 12:
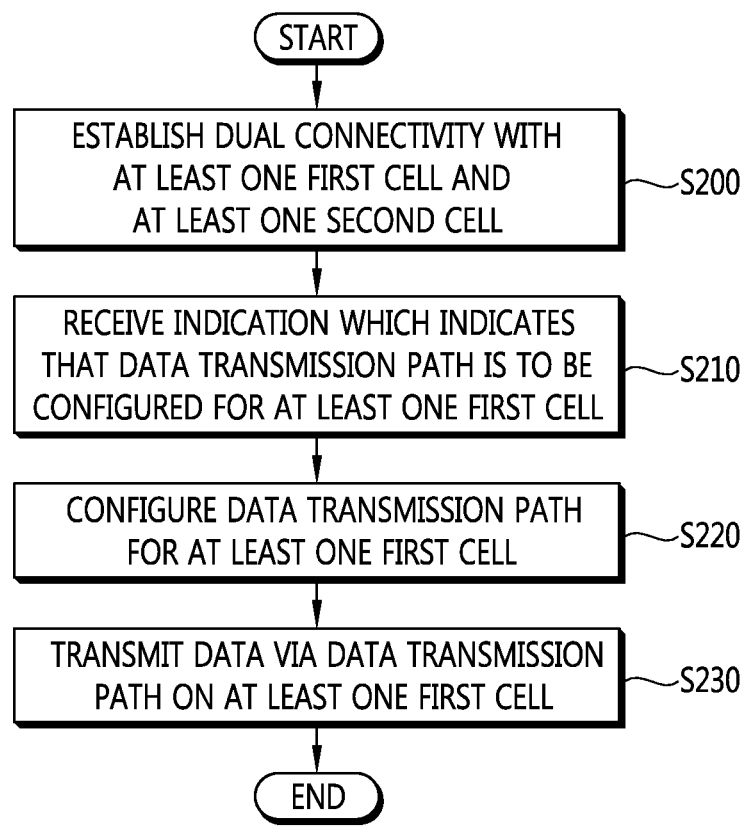
FIG. 12 shows an example of a method for transmitting data according to an embodiment of the present invention.

FIG. 12 shows an example of a method for transmitting data according to an embodiment of the present invention.

In step S200, the UE establishes dual connectivity with at least one first cell and at least one second cell. The at least one first cell may be included in a first cell group. The at least one second cell may be included in a second cell group.

In step S210, the UE receives an indication which indicates that a data transmission path of a radio bearer is to be configured for the at least one first cell. The indication may further include information on the at least one first cell for which the data transmission path of the radio bearer is to be configured. The data transmission path of the radio bearer for the at least one first cell may be configured based on the information on the at least one first cell. Further, the information on the at least one first cell may include at least one of a cell index, cell identifier (ID), and physical cell ID of the at least one first cell. The information on the at least one first cell may include an index of a group in which the at least one first cell is included. At this time, the eNB indicates the UE group information, which indicates which cell belongs to which group, for the index of the group.

In step S220, the UE configures the data transmission path of the radio bearer for the at least one first cell. In step S230, the UE transmits data via the data transmission path on the at least one first cell.

Meanwhile, it is also possible that the network indicates to the UE association information between a radio bearer and a cell serving the UE. The radio bearer may be the existing radio bearer. Or, the radio bearer may be new radio bearer that is to be configured together with the indicated association information. The cell or group of cells serving the UE may be the existing cell or a group of cells that is already configured to the UE. Or, the cell or group of cells serving the UE may be new cell or group of cells that is to be configured together with the indicated association information.

The association information may consist of a radio bearer type, a radio bearer identifier, and an identifier of associated cell or associated group of cells. If the association information is included as part of a configuration for a specific cell or group of cells, the association information may be provided without cell/group identifier. In this case, the UE assumes that the indicated RB is re-associated with the implicitly indicated cell or group cells.

The default cell may be a pre-determined cell such as:
PCell; or
C-plane anchor cell for which the SRBs of the UE are configured; or
C-plane anchor cell for which a certain SRB (e.g., SRB1) of the UE is configured; or
Connection management cell for which the UE applies radio link monitoring; or
Connection management cell for which security configuration for C-plane (SRBs) is configured.

Alternatively, the default cell may be indicated by the network.

Figure 13:
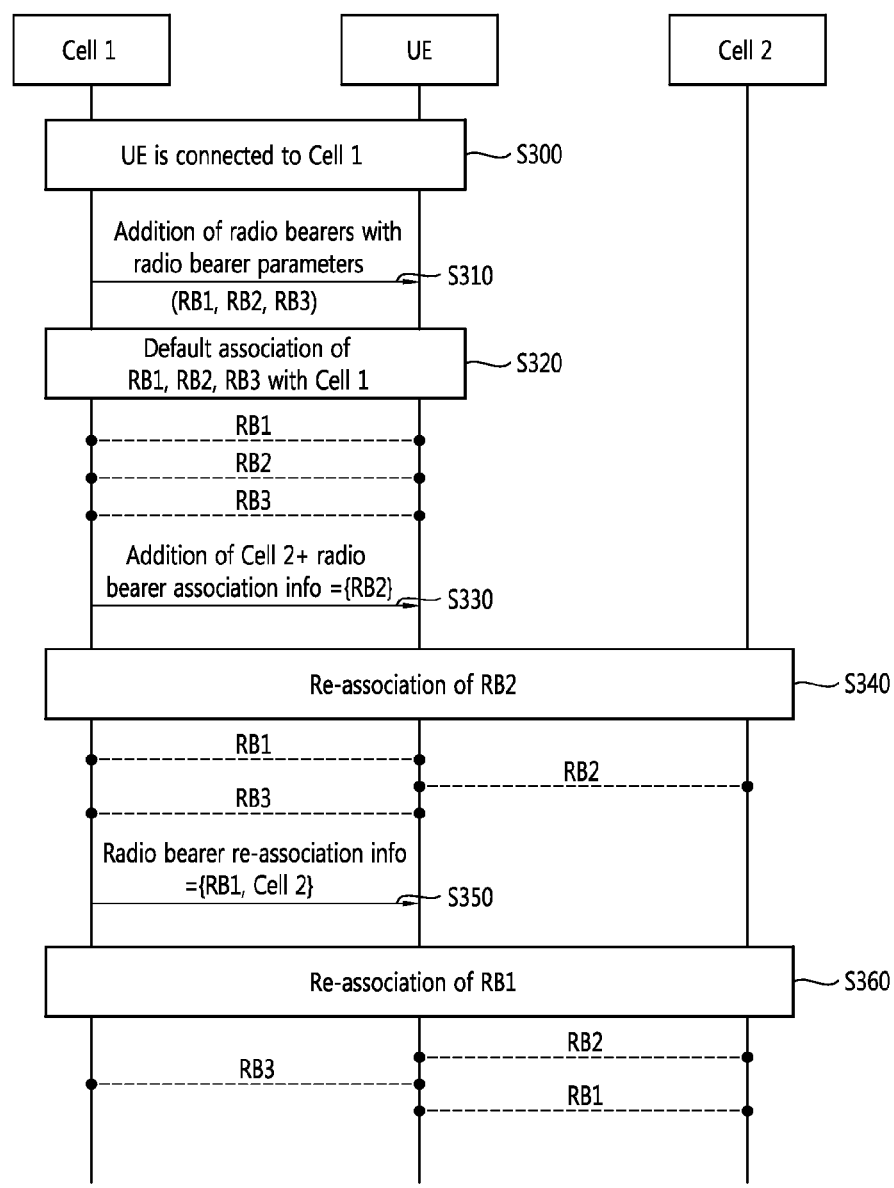
FIG. 13 shows an example of re-association of radio bearer configuration across configured cells according to an embodiment of the present invention.

For example, it is also possible that when new cell (e.g., small cell) is additionally configured to the UE in addition to what is already configured, the network may further indicate in a command for cell addition the association between existing radio bearer and the newly added radio bearer. Further, for example, it is also possible that the network may indicate to the UE, without new cell addition, the association between existing radio bearer and a specific cell that is already configured to the UE FIG. 13 shows an example of re-association of radio bearer configuration across configured cells according to an embodiment of the present invention.

In step S300, the UE is connected to a cell 1.

In step S310, the UE receives a command for addition of radio bearers with radio bearer parameters. Accordingly, RB1, RB2, and RB3 are configured for the UE. In step S320, the UE has default association of RB1, RB2, and RB3 with the cell 1.

In step S330, the UE further receives a command addition of a cell 2 and radio bearer association information which indicates that the RB2 is to be associated with the cell 2. In step S340, the RB2 is re-associated with the cell 2.

In step S350, the UE further receives radio bearer association information which indicates that the RB1 is to be associated with the cell 2. In step S360, the RB1 is re-associated with the cell 2.

Figure 14:
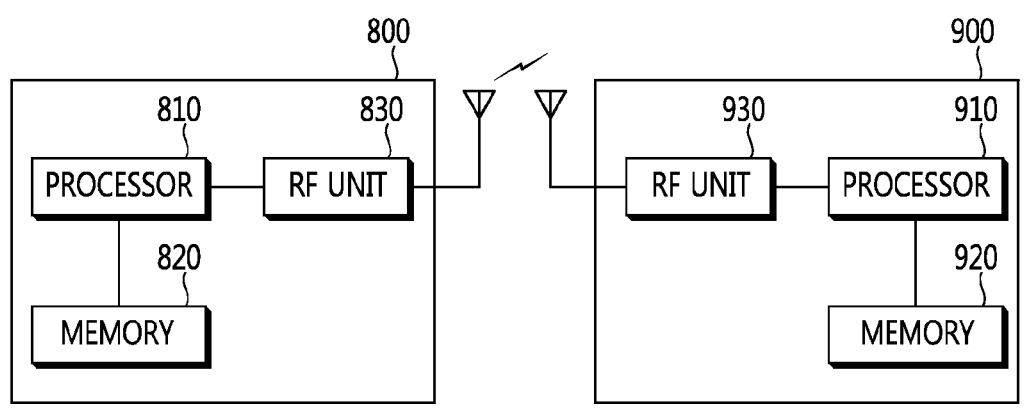
FIG. 14 shows a wireless communication system to implement an embodiment of the present invention.

FIG. 14 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a user equipment (UE), data in a wireless communication system, the method comprising:
   establishing dual connectivity with a macro cell and a small cell,
   wherein the macro cell is controlled by a master eNodeB (MeNB) and the small cell is controlled by a secondary eNodeB (SeNB);
   after establishing the dual connectivity, receiving both a first indication and a second indication from the MeNB, the first indication indicating that a data transmission path of a signaling radio bearer (SRB) is to be configured only for the macro cell, and the second indication indicating that a data transmission path of a data radio bearer (DRB) is to be configured only for the small cell,
   wherein the received first indication includes a cell identifier (ID) of the macro cell for which the data transmission path of the SRB is to be configured, and
   wherein the received second indication includes a cell ID of the small cell for which the data transmission path of the DRB is to be configured;
   configuring the data transmission path of the SRB only for the macro cell based on the cell ID of the macro cell included in the received first indication;
   configuring the data transmission path of the DRB only for the small cell based on the cell ID of the small cell included in the received second indication; and
   transmitting data via the configured data transmission path of the SRB on the macro cell and the DRB on the small cell.

2. The method of claim 1, wherein the macro cell is included in a macro cell group.

3. The method of claim 1, wherein the small cell is included in a small cell group.

4. The method for claim 2, wherein the received first indication further includes an index of the macro cell group, in which the macro cell is included, indicating the macro cell belongs to which macro cell group.

5. The method for claim 3, wherein the received second indication further includes an index of a small cell group, in which the small cell is included, indicating the small cell belongs to which small cell group.

6. A user equipment (UE) in a wireless communication system, the UE comprising:
   a memory;
   a radio frequency (RF) unit for transmitting or receiving a radio signal; and
   a processor coupled to the RF unit and the memory, that establishes dual connectivity with a macro cell and a small cell,
   wherein the macro cell is controlled by a master eNodeB (MeNB) and the small cell is controlled by a secondary eNodeB (SeNB);
   after establishing the dual connectivity, controls the RF unit to receive both a first indication and a second indication from the MeNB, the first indication indicating that a data transmission path of a signaling radio bearer (SRB) is to be configured only for the macro cell, and the second indication indicating that a data transmission path of a data radio bearer (DRB) is to be configured only for the small cell,
   wherein the received first indication includes a cell identifier (ID) of the macro cell for which the data transmission path of the SRB is to be configured, and
   wherein the received second indication includes a cell ID of the small cell for which the data transmission path of the DRB is to be configured;
   configures the data transmission path of the SRB only for the macro cell based on the a cell ID of the macro cell included in the received first indication;
   configures the data transmission path of the DRB only for the small cell based on the a cell ID of the small cell included in the received second indication; and
   controls the RF unit to transmit data via the configured data transmission path of the SRB on the macro cell and the DRB on the small cell.

* * * * *